Patented June 10, 1952

2,599,974

UNITED STATES PATENT OFFICE 2,599,974

POLYMERIC COMPOUNDS CONDENSED FROM EPICHLORHYDRIN AND A BIFUNCTIONAL AMINO COMPOUND, AND METHOD OF PRODUCTION

Albert Stanley Carpenter, Sutton Coldfield, Birmingham, and Eric R. Wallsgrove, Coventry, England, assignors to Courtaulds Limited, London, England, a British company No Drawing. Application February 15, 1950, Serial No. 144,373. In Great Britain March 2, 1949

12 Claims. (Cl. 260—42)

This invention relates to the production of polymeric compounds and to the production from such compounds of threads, fibres, filaments and the like, hereinafter generally referred to as "threads."

It is known that epichlorhydrin may be reacted with aliphatic, aromatic or heterocyclic secondary amines to produce non-polymeric products; for example British Patent Specification No. 275,622 describes the reaction of epichlorhydrin and secondary amines to form α-tertiaryaminoepihydrins which are then reacted with bases to form unsymmetrically substituted diaminopropanols.

The specification of application Serial No. 124,944, filed 1 November 1949 describes a process for the production of thermoplastic resins by heating substantially equimolecular proportions of epichlorhydrin and at least one aromatic dihydroxy compound in which the hydroxyl groups are phenolic and the carbon atoms linked to the hydroxyl groups are separated by at least one other carbon atom, together with a quantity of an alkali such that the ratio of the number of molecules of alkali to the number of molecules of the dihydroxy compound is at least 1.0, the heating being continued until a fibre-forming resinous product is obtained.

French Specification No. 933,219 describes the production of resinous products suitable for use as anion-active agents by condensing at least 2 mols of an alpha-chloro, beta, gamma-epoxy compound such as epichlorhydrin with one mol of a polyalkylene polyamine, preferably in the presence of a strong alkali.

The object of the present invention is to produce a novel class of polymeric compounds which are in general suitable for the production of threads.

In accordance with the present invention, a process for the production of polymeric compounds comprises heating together, in substantially equimolecular proportion, epichlorhydrin and a bifunctional compound having as one of its functional groups a secondary amine group and as the other functional group a secondary amine group or a hydroxyl group. The functional groups of these bifunctional compounds are separated by at least 4 carbon atoms, and the compounds contain either a benzene ring or a saturated heterocyclic ring structure containing 5 carbon and one nitrogen atoms. According to the invention, the epichlorhydrin and the bifunctional compound are heated together with an alkali in an amount which is at least substantially the chemical equivalent of the chlorine content of the epichlorhydrin used.

In accordance with further embodiments of the present invention, the bifunctional secondary amino compound as defined is partly replaced, for example by a dihydric phenol as used in application Serial No. 124,944 or by a monohydroxy benzoic acid such as parahydroxy benzoic acid whereby mixed polymeric products are obtained.

The present invention therefore also includes a process for the production of mixed polymeric products which comprises heating together epichlorhydrin, a bifunctional compound having a secondary amine group as one of its functional groups and as the other functional group a group chosen from the class consisting of secondary amine groups and hydroxyl groups, the functional groups being separated by at least four carbon atoms, said compounds containing either a benzene ring or a saturated heterocyclic ring structure containing five carbon and one nitrogen atoms, an aromatic dihydroxy compound in which the hydroxyl groups are phenolic and the carbon atoms linked to the hydroxyl groups are separated by at least one other carbon atom, and an alkali in an amount which is at least the chemical equivalent of the chlorine content of the epichlorhydrin used, the combined proportions of the said bifunctional compound and the said aromatic dihydroxy compound used being substantially the equimolecular equivalent of the epichlorhydrin used.

The invention also includes a process for the production of mixed polymeric products which comprises heating together epichlorhydrin, a monohydroxy benzoic acid, a bifunctional compound having a secondary amine group as one of its functional groups and as the other functional group a group chosen from the class consisting of secondary amine groups and hydroxyl groups the functional groups being separated by at least four carbon atoms, said compounds containing either a benzene ring or a saturated heterocyclic ring structure containing five carbon and one nitrogen atoms; and an alkali in an amount which is at least the chemical equivalent of the chlorine content of the epichlorhydrin used, the combined proportions of the said bifunctional compound and the monohydroxy benzoic acid used being substantially the equimolecular equivalent of the epichlorhydrin used.

In making mixed polymeric products according to the invention the bifunctional secondary amino compound as defined preferably forms at least 10 per cent of the mixture which is reacted with the epichlorhydrin and the alkali.

Suitable secondary amino bifunctional compounds for use in the present invention are 4,4'-dipiperidyl

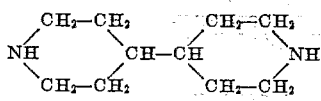

para-methylaminophenol and other N-alkyl-substituted amino phenols, and bis-4,4'-(N-methylaminophenyl) methane, H₃C—HN

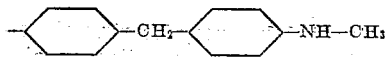

Suitable dihydric phenols for use in making mixed polymeric products are hydroquinone, resorcinol and 3,3' or 4,4' dihydroxy diphenyls.

The process according to the invention for making polymeric products may be effected in a single stage reaction by heating the epichlorhydrin, the bifunctional secondary-amino compound and the alkali together, preferably under a reflux condenser, until a resinous polymer separates. A two-stage reaction may also be used, for example by first reacting the epichlorhydrin with from 50 to 100 per cent of the bifunctional compound as defined and then heating the product with the alkali and any remaining bifunctional compound until a resinous polymer separates; in an alternative two-stage reaction, one mol of the bifunctional compound may be first reacted with two mols of epichlorhydrin and its equivalent of alkali to form a di-epoxide compound which is then heated with a further mol of the bifunctional compound containing a small proportion of an alkali catalyst.

Mixed polymeric products may be prepared according to the invention by heating the four reactants as defined together, preferably under a reflux condenser, until a resinous mixed polymer separates. Two-stage processes may also be used. For example the bifunctional secondary-amino compound as defined may be used in one stage and a dihydric phenol as defined or a monohydroxy benzoic acid used in the other stage; thus 1 mol of the dihydric phenol, 2 mols of epichlorhydrin and 2 mols of alkali may be reacted together in the first stage to form an aromatic bis-glycidyl ether by the method described by Werner and Farenhorst (Receuil des Travaux Chimique de Pays Bas, vol. 67 (1948), pages 438 to 441) and then reacting the bis-glycidyl ether with 1 mol of the bifunctional secondary-amino compound to form a resinous mixed polymeric product. Alternatively, mixtures of the bifunctional compound with a dihydric phenol as defined or with a hydroxy benzoic acid may be used in both stages.

The processes according to the invention are preferably effected in the presence of a diluent such as aqueous alcohol.

The epichlorhydrin may be formed in situ by using alpha- or beta-glycerol dichlorhydrin, or a mixture of both, with one molar equivalent of caustic alkali, in place of the epichlorhydrin. In this case, the caustic alkali used to react with the glycerol chlorhydrin is additional to the alkali required to effect the reaction according to the invention.

The polymers obtained according to the invention are in general thermoplastic products of high molecular weight which can usually be drawn or melt-spun to form threads generally capable of being cold-drawn.

The invention is illustrated by the following Examples in which the parts are by weight:

Example 1

10.1 parts (1 mol) of epichlorhydrin, a boiling solution of 18.4 parts (1 mol) of 4,4', dipiperidyl in 160 parts of ethyl alcohol and a cold solution of 4.55 parts (1.04 mol) of caustic soda in 20 parts of water were mixed together and heated for 3 hours under a reflux condenser. At the end of this time a finely-divided precipitate had formed; the pasty mass was poured into twice its volume of water, filtered and the precipitate was washed three times with hot water and dried at 100° centigrade.

The polymer obtained had an intrinsic viscosity in a 1 per cent solution in meta cresol of 0.42 and when heated was capable of being drawn into fibres.

Example 2

A product consisting of the mixed stereoisomers of 1:4 bis (2:3 epoxypropoxy) benzene (otherwise known as hydroquinone bis-glycidyl ether) was prepared from 1 mol of hydroquinone, 2 mols of epichlorhydrin and 2 mols of caustic soda by the method described by Werner and Farenhorst (Receuil des Travaux Chimique de Pays Bas. vol. 67 (1948), pages 438 to 441) and 12 parts of this product, 9.15 parts of 4,4'-dipiperidyl, 0.25 part of caustic soda (as catalyst) and 80 parts of ethyl alcohol were mixed and heated under a reflux condenser for 1½ hours, at the end of which time a finely-divided cream-coloured solid had separated. This solid was filtered off, washed with ethyl alcohol and then with water and finally dried first at 100° centigrade and then in a vacuum desiccator.

Example 3

17.2 parts of para-methylamino phenol sulphate, 9.25 parts of epichlorhydrin, 16 parts of alcohol, 20 parts of water and 4.2 parts of caustic soda (a slight excess over the amount required to liberate the free para-methylamino phenol) were mixed together in a vessel fitted with a stirrer and a condenser. The apparatus was swept out with oxygen-free nitrogen. The mixture was then heated on a boiling water bath under reflux with stirring in an atmosphere of nitrogen for 45 minutes. A solution of 4 parts of caustic soda in 10 parts of water was then introduced slowly over a period of 1 hour down the condenser, the reaction mixture being heated under reflux and stirred throughout. When all the caustic soda had been added the mixture was heated under reflux for 3 hours. The product had separated as a plastic mass which was separated, washed three times with boiling water and dried.

The product melted at approximately 120° centigrade and when molten was readily drawn out into fibres.

Example 4

13.6 parts (.82 mol) of 4,4'-dipiperidyl, 2.2 parts of hydroquinone (.2 mol), 9.25 parts of epichlorhydrin (1 mol), 4.4 parts of caustic soda (1.1 mol), 80 parts of alcohol and 10 parts of water were mixed and heated under reflux for 7 hours with continuous vigorous stirring. The product which separated was a viscous mass adhering to the sides of the vessel; 200 parts of water were added, the product separated, washed four times with boiling water and dried. The product was a dark thermoplastic polymer.

Example 5

15.4 parts (0.93 mol) of 4,4'-dipiperidyl, 1.38 parts (0.1 mol) of para-hydroxy-benzoic acid, 9.25 parts (1 mol) of epichlorhydrin, 4.4 parts (1.1 mol) of caustic soda, 80 parts of alcohol and 10 parts of water were mixed and heated under reflux for six hours with vigorous stirring. The reaction mixture was diluted with 500 parts of water, brought to the boil and filtered hot to separate the product which was washed twice with boiling water and dried.

The product was an off-white fibre-forming thermoplastic powder which softened at 200° centigrade. Its intrinsic viscosity in a 1 per cent solution in meta-cresol was 0.41.

The term "cyclic amino compound" is used in the claims to include compounds containing either a benzene ring structure or a saturated heterocyclic ring structure consisting of five carbon atoms and a single nitrogen atom.

What we claim is:

1. A process as claimed in claim 5, wherein the epichlorhydrin is reacted with from 50 to 100 per cent of the said bifunctional compound and the product is heated with the alkali and up to 50 per cent of the bifunctional compound.

2. A process as claimed in claim 5, wherein the bifunctional compound used is 4,4'-dipiperidyl.

3. A process as claimed in claim 5, wherein the bifunctional compound used is para-methyl-aminophenol.

4. A process as claimed in claim 5, wherein the bifunctional reactant is a mixture of any of said bifunctional amino compounds and an aromatic dihydroxy compound in which the hydroxyl groups are phenolic and the carbon atoms linked to the hydroxyl groups are separated by at least one other carbon atom and wherein 1 mol of the aromatic dihydroxy compound is reacted with 2 mols of epichlorhydrin and 2 mols of alkali to form an aromatic bisglycidyl ether and the bisglycidyl ether so obtained is reacted with 1 mol of the said bifunctional compound to form a resinous mixed polymeric product.

5. A process for the production of polymeric compounds which comprises heating together in substantially equimolecular proportions, epichlorhydrin and a bifunctional reactant selected from the group consisting of (1) bifunctional amino compounds containing a benzene ring and in which both functional groups are secondary amino groups and are separated by at least four carbon atoms, (2) bifunctional amino compounds containing a saturated heterocyclic ring structure having five carbon and one nitrogen atoms, and in which both functional groups are secondary amino groups separated by at least four carbon atoms, (3) bifunctional amino compounds containing a benzene ring, and in which one functional group is a secondary amine and one functional group is an hydroxyl group, said functional groups being separated by at least four carbon atoms and (4) mixtures of any of said bifunctional amino compounds and a compound selected from the group consisting of (a) aromatic dihydroxy compounds in which the hydroxyl groups are phenolic and the carbon atoms linked to the hydroxyl groups are separated by at least one other carbon atom, and (b) monohydroxy benzoic acids; and an alkali in an amount which is at least the chemical equivalent of the chlorine content of the epichlorhydrin used.

6. A process as claimed in claim 5 in which the bifunctional reactant is a mixture of said bifunctional amino compounds and an aromatic dihydroxy compound in which the hydroxyl groups are phenolic and the carbon atoms linked to the hydroxyl groups are separated by at least one other carbon atom.

7. A process as claimed in claim 6, wherein the aromatic dihydroxy compound used is hydroquinone.

8. A process for the production of polymeric compounds which comprises heating together epichlorhydrin, 4,4'-dipiperidyl and an aromatic dihydroxy compound in which the hydroxyl groups are phenolic and the carbon atoms linked to the hydroxyl groups are separated by at least one other carbon atom and an alkali in an amount which is at least the chemical equivalent of the chlorine content of the epichlorhydrin used, the combined proportions of said 4,4'-dipiperidyl and said aromatic dihydroxy compound being substantially the equimolecular equivalent of the epichlorhydrin used.

9. A process as claimed in claim 5, wherein the bifunctional reactant used is a mixture of said bifunctional amino compounds and a monohydroxy benzoic acid.

10. A process as claimed in claim 9, wherein the monohydroxy benzoic acid used is para-hydroxy benzoic acid.

11. A process for the production of polymeric compounds which comprises heating together epichlorhydrin, 4,4'-dipiperidyl, a monohydroxy benzoic acid, and an alkali in an amount which is at least the chemical equivalent of the chlorine content of the epichlorhydrin used, the combined proportions of the 4,4'-dipiperidyl and the monohydroxy benzoic acid being substantially the equimolecular equivalent of the epichlorhydrin used.

12. A composition of matter comprising a polymeric compound obtained by heating together in substantially equimolecular proportions epichlorhydrin and a bifunctional reactant selected from the group consisting of (1) bifunctional amino compounds containing a benzene ring, and in which both functional groups are secondary amino groups separated by at least four carbon atoms, (2) bifunctional amino compounds containing a saturated heterocyclic ring structure having five carbon and one nitrogen atoms, and in which both functional groups are secondary amino groups separated by at least four carbon atoms, (3) bifunctional amino compounds containing a benzene ring, and in which one functional group is a secondary amine and one functional group is an hydroxyl group, said functional groups being separated by at least four carbon atoms, and (4) mixtures of any of said bifunctional amino compounds and a compound selected from the group consisting of (a) aromatic dihydroxy compounds in which the hydroxyl groups are phenolic and the carbon atoms linked to the hydroxyl groups are separated by at least one other carbon atom and (b) monohydroxy benzoic acids; and an alkali in an amount which is at least the chemical equivalent of the chlorine content of the epichlorhydrin used.

A. STANLEY CARPENTER.
E. R. WALLSGROVE.

REFERENCES CITED

The following references are of record in the file of this patent:

UNITED STATES PATENTS

| Number | Name | Date |
|---|---|---|
| 2,500,600 | Bradley | Mar. 14, 1950 |

FOREIGN PATENTS

| Number | Country | Date |
|---|---|---|
| 124,294 | Australia | May 19, 1947 |